(12) United States Patent
Salian et al.

(10) Patent No.: US 11,450,043 B2
(45) Date of Patent: Sep. 20, 2022

(54) ELEMENT ASSOCIATION AND MODIFICATION

(71) Applicant: Adobe Inc., San Jose, CA (US)

(72) Inventors: Nithesh Gangadhar Salian, Mangalore (IN); M A Maharaj, Chennai (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 15/962,311

(22) Filed: Apr. 25, 2018

(65) Prior Publication Data

US 2019/0333258 A1 Oct. 31, 2019

(51) Int. Cl.
*G06T 11/60* (2006.01)
*G06F 3/04847* (2022.01)
*G06F 3/04842* (2022.01)

(52) U.S. Cl.
CPC .......... *G06T 11/60* (2013.01); *G06F 3/04842* (2013.01); *G06F 3/04847* (2013.01)

(58) Field of Classification Search
CPC ...... G06T 11/60; G06T 11/80; G06F 3/04842; G06F 3/04847; G06F 3/04845; G06F 3/0481; G06F 3/04817; G06F 3/0482; G06F 3/04886; G06F 2203/04803; G06F 17/24; G06F 17/218; G06F 17/211; G06F 8/34; G06F 9/451
See application file for complete search history.

(56) References Cited

U.S. PATENT DOCUMENTS

| | | | | |
|---|---|---|---|---|
| 8,572,500 B2* | 10/2013 | Salva | ...................... | G06F 3/048 715/762 |
| 8,914,719 B2* | 12/2014 | Sugimoto | ............. | G06F 40/103 715/243 |
| 9,389,759 B2* | 7/2016 | Hsu | ........................ | G06F 3/0484 |
| 2003/0004724 A1* | 1/2003 | Kahn | .................... | G10L 15/063 704/260 |
| 2005/0240866 A1* | 10/2005 | Berstis | ..................... | G06F 9/543 715/248 |
| 2006/0253830 A1* | 11/2006 | Rajanala | ................... | G06F 8/36 717/105 |
| 2007/0061716 A1* | 3/2007 | Kato | ..................... | G06F 3/0483 715/209 |

(Continued)

*Primary Examiner* — Kieu D Vu
*Assistant Examiner* — Rami R Okasha
(74) *Attorney, Agent, or Firm* — F. Chau & Associates, LLC

(57) ABSTRACT

Systems and methods for design element association and modification are provided. An example method for editing elements in multiple artboards includes receiving an isolation session-initiation user input that identifies a first design element arrangement on a first artboard in a workspace on a user interface. The method also includes, responsive to receiving the isolation session-initiation user input, identifying a second artboard in the workspace based on the second artboard including a second design element arrangement that is associated with the first design element arrangement, and updating the user interface to display the first artboard and the second artboard within an isolation session. As an example updating the user interface may include displaying the first design element arrangement and the second design element arrangement using a first style, and displaying other portions of the first artboard and the second artboard using a second style.

15 Claims, 12 Drawing Sheets

(56) References Cited

U.S. PATENT DOCUMENTS

| | | | |
|---|---|---|---|
| 2009/0055755 A1* | 2/2009 | Hicks | G06F 16/958 715/760 |
| 2009/0234882 A1* | 9/2009 | Ota | G06F 16/58 |
| 2009/0249251 A1* | 10/2009 | Eischeid | G06F 3/0481 715/810 |
| 2010/0313156 A1* | 12/2010 | Louch | H04L 67/10 715/769 |
| 2011/0271218 A1* | 11/2011 | Berger | G06F 3/0486 715/770 |
| 2011/0302494 A1* | 12/2011 | Callery | G06F 16/4393 715/732 |
| 2011/0302556 A1* | 12/2011 | Drukman | G06F 8/33 717/113 |
| 2012/0311485 A1* | 12/2012 | Caliendo, Jr. | G09G 5/14 715/784 |
| 2012/0311501 A1* | 12/2012 | Nonez | G06F 3/04817 715/838 |
| 2013/0019189 A1* | 1/2013 | Stewart | G06F 16/958 715/760 |
| 2013/0227396 A1* | 8/2013 | Chinnathambi | G06F 16/972 715/235 |
| 2013/0238977 A1* | 9/2013 | Abrahami | G06F 40/14 715/234 |
| 2013/0278593 A1* | 10/2013 | Kranzberg | G06T 19/20 345/419 |
| 2013/0290834 A1* | 10/2013 | Ginetti | G06F 30/39 715/243 |
| 2014/0013271 A1* | 1/2014 | Moore | G06F 3/0482 715/792 |
| 2014/0019890 A1* | 1/2014 | Klinger | G06F 9/542 715/762 |
| 2014/0282377 A1* | 9/2014 | Hammontree | G06F 3/04855 717/109 |
| 2015/0019962 A1* | 1/2015 | Kim | G06F 3/04842 715/277 |
| 2015/0143233 A1* | 5/2015 | Weksler | G06F 40/166 715/256 |
| 2015/0205797 A1* | 7/2015 | Leventhal | G06F 40/106 707/748 |
| 2015/0242093 A1* | 8/2015 | Yost | G06F 3/04842 715/763 |
| 2015/0309689 A1* | 10/2015 | Jin | G06F 3/04817 715/765 |
| 2016/0034438 A1* | 2/2016 | Yalovsky | G06F 40/166 715/780 |
| 2016/0070422 A1* | 3/2016 | Hammontree | G06F 3/04855 717/109 |
| 2016/0078595 A1* | 3/2016 | Ogino | G06F 3/04883 345/619 |
| 2016/0179334 A1* | 6/2016 | Fleizach | H04M 19/04 715/863 |
| 2016/0299993 A1* | 10/2016 | Perkins | G06F 3/04842 |
| 2016/0364398 A1* | 12/2016 | Nelson | G06F 40/106 |
| 2017/0024481 A1* | 1/2017 | Hagopian | G06F 16/9535 |
| 2017/0139891 A1* | 5/2017 | Ah-Soon | G06Q 10/063 |
| 2018/0329610 A1* | 11/2018 | Sonnino | G06F 3/04842 |

\* cited by examiner

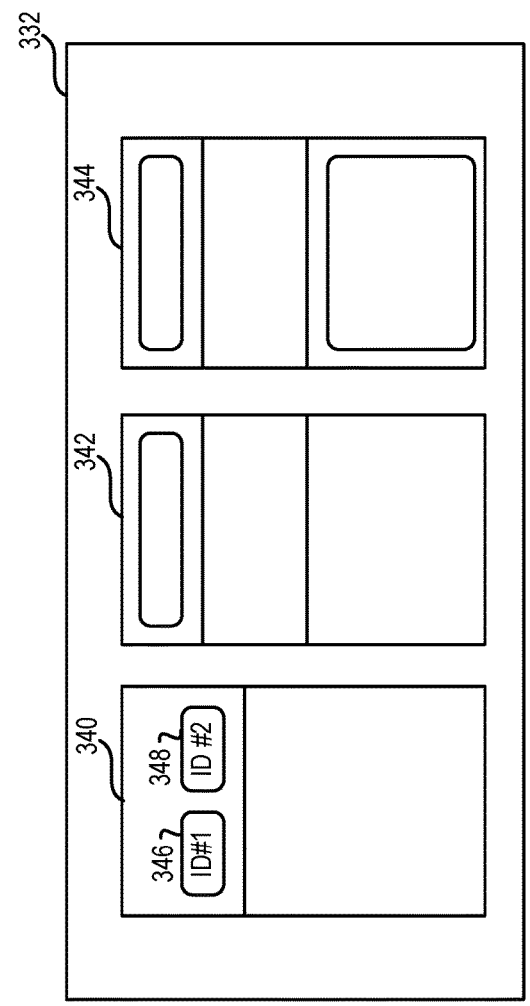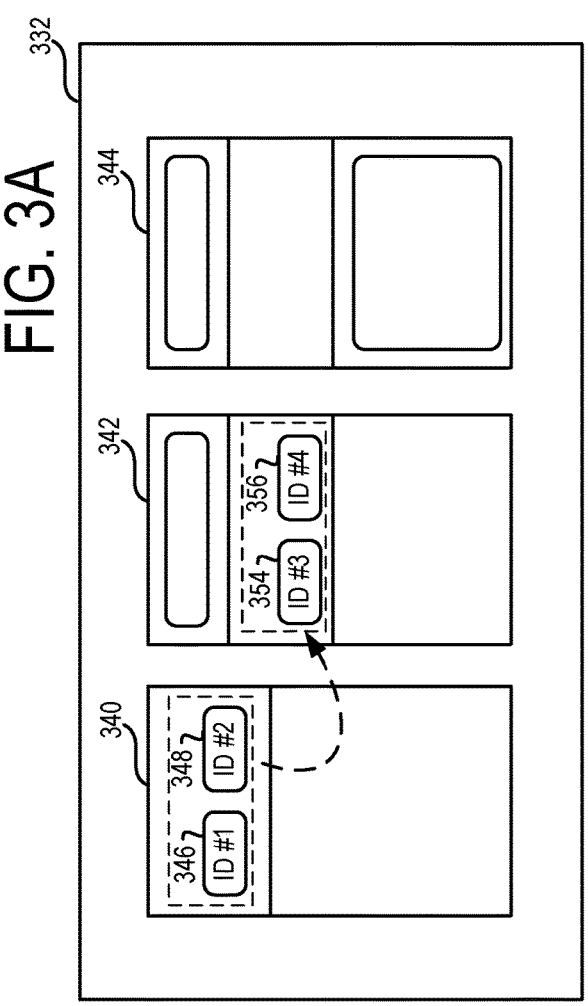

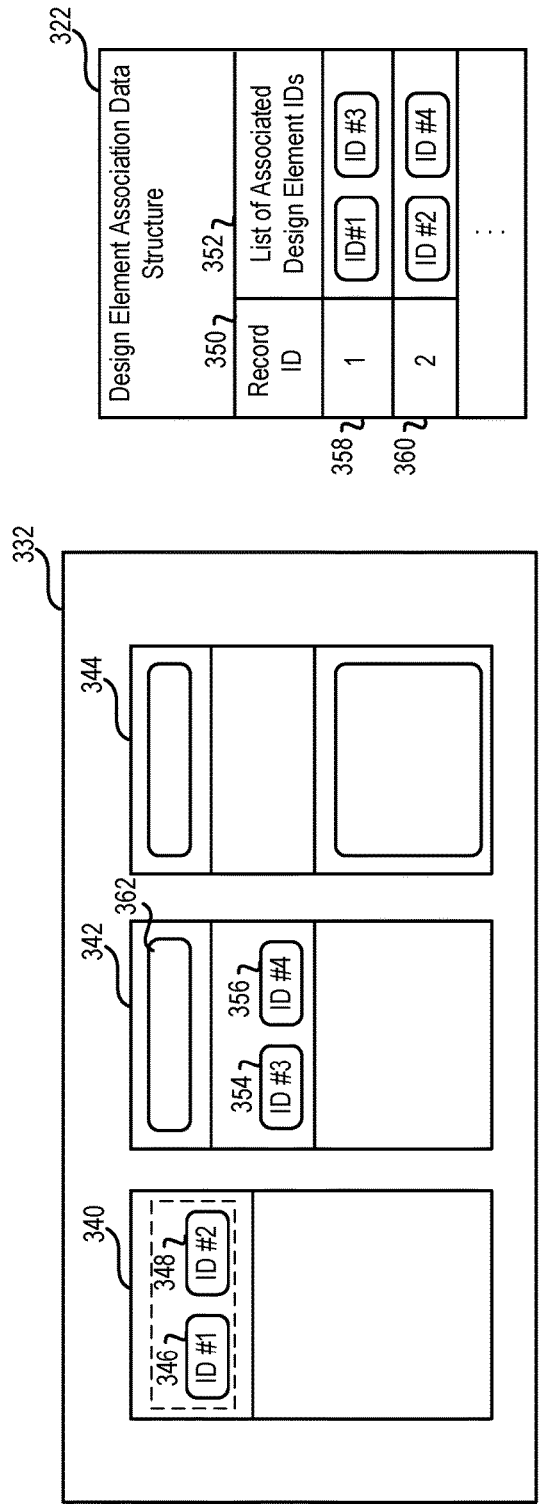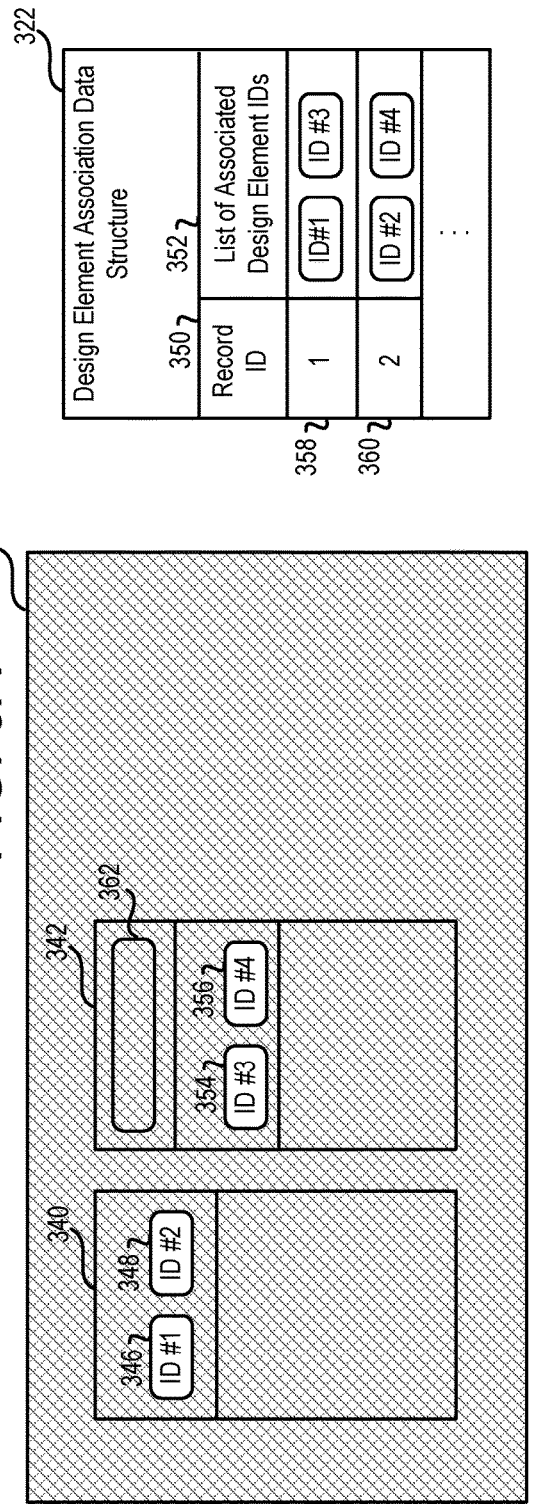

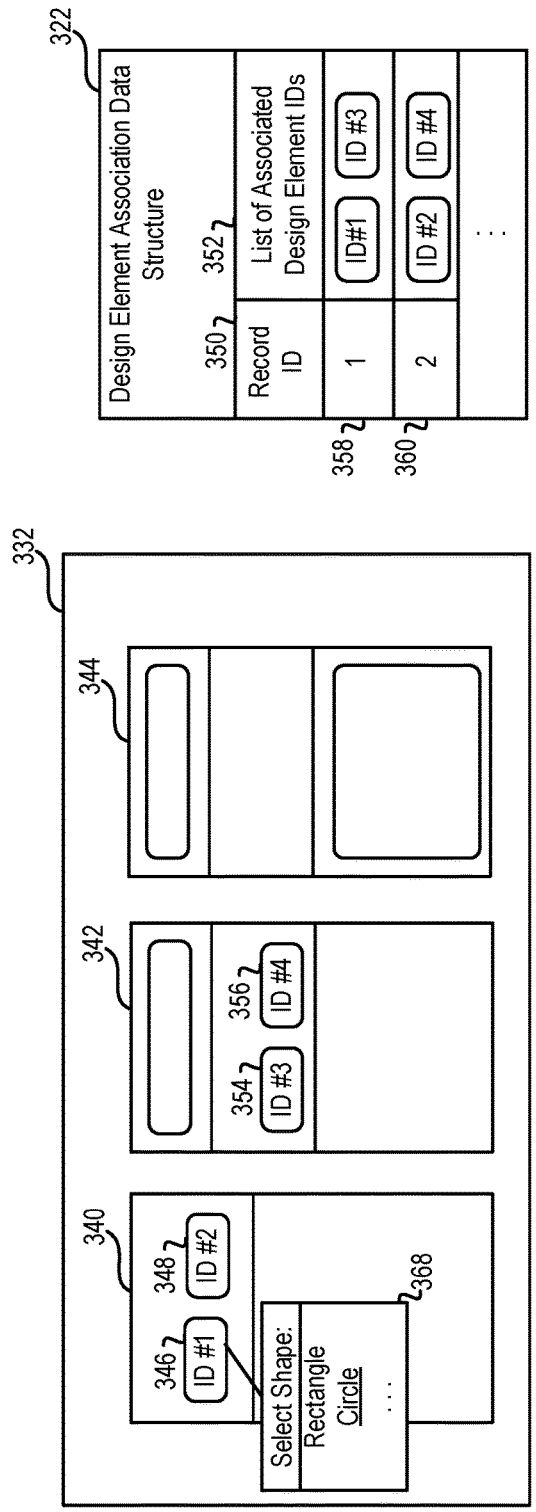
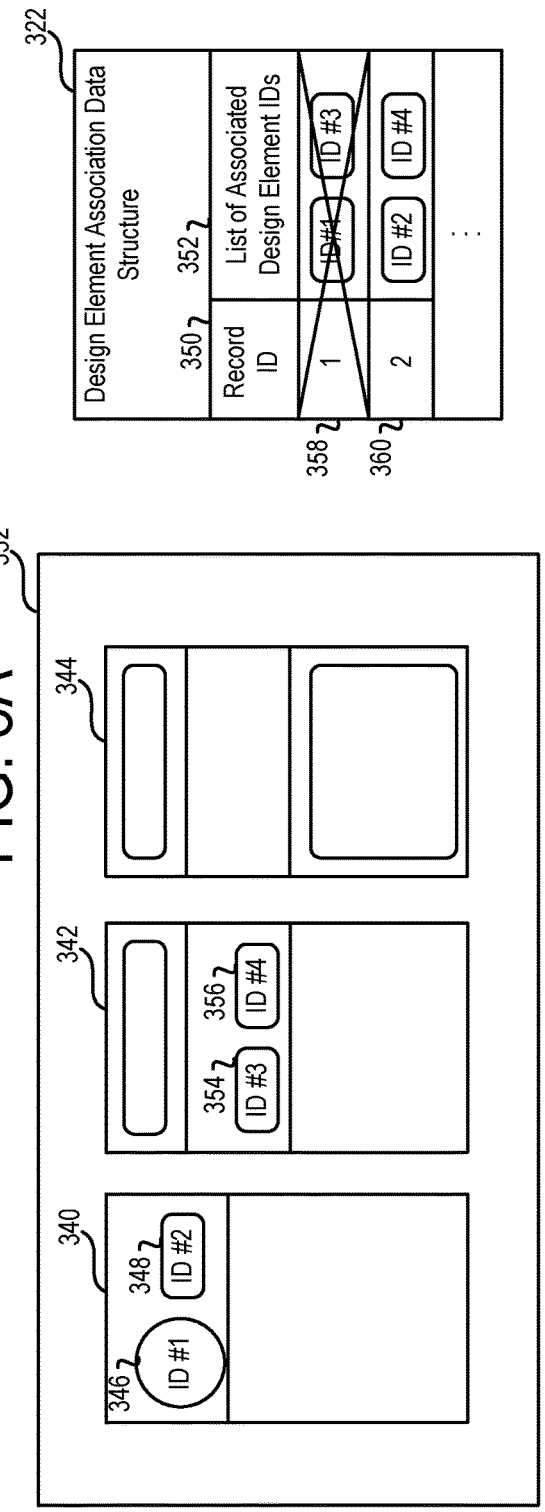
FIG. 8A
FIG. 8B

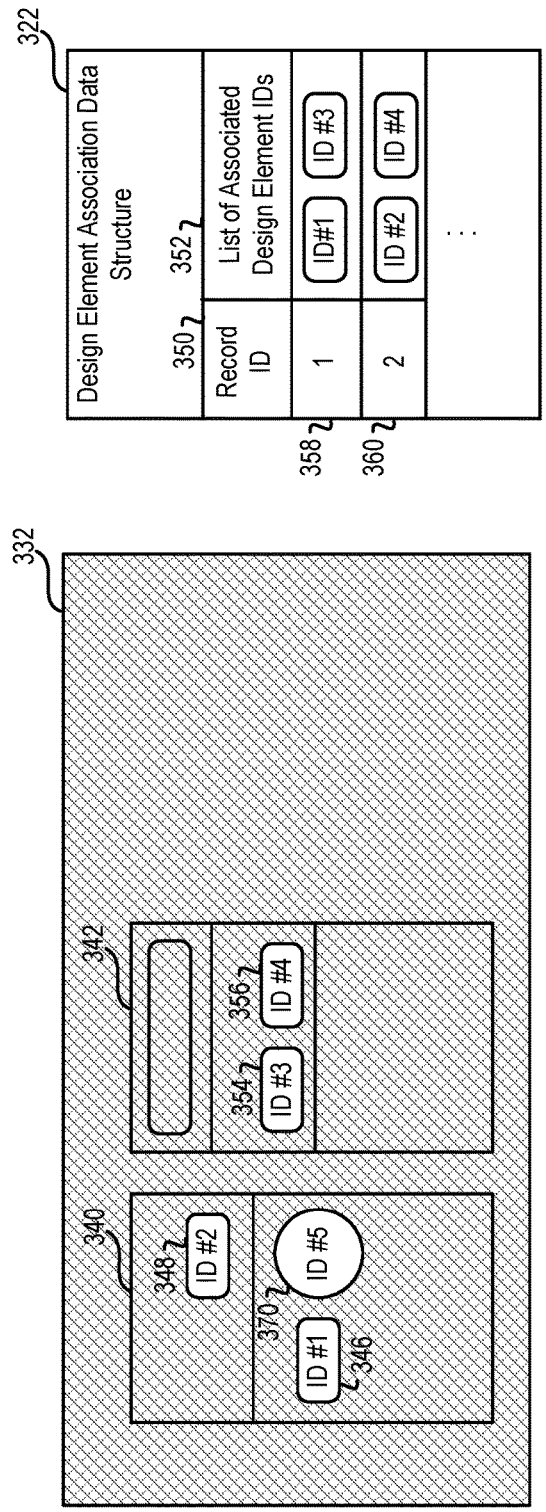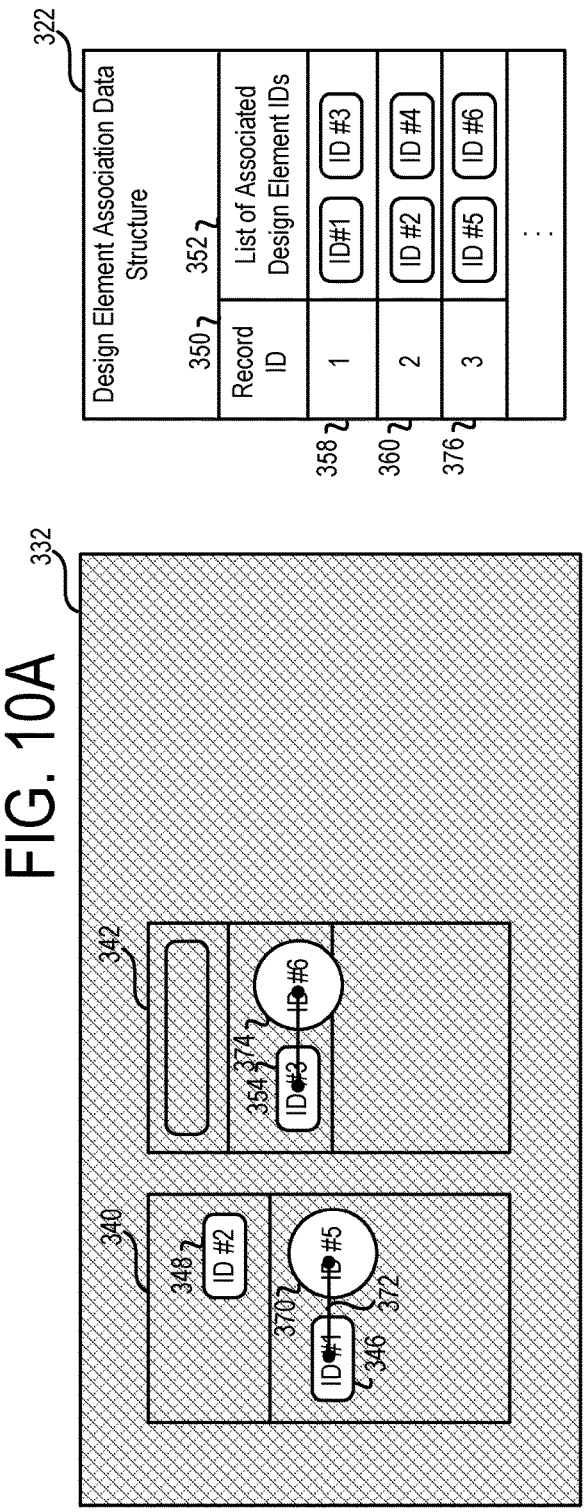

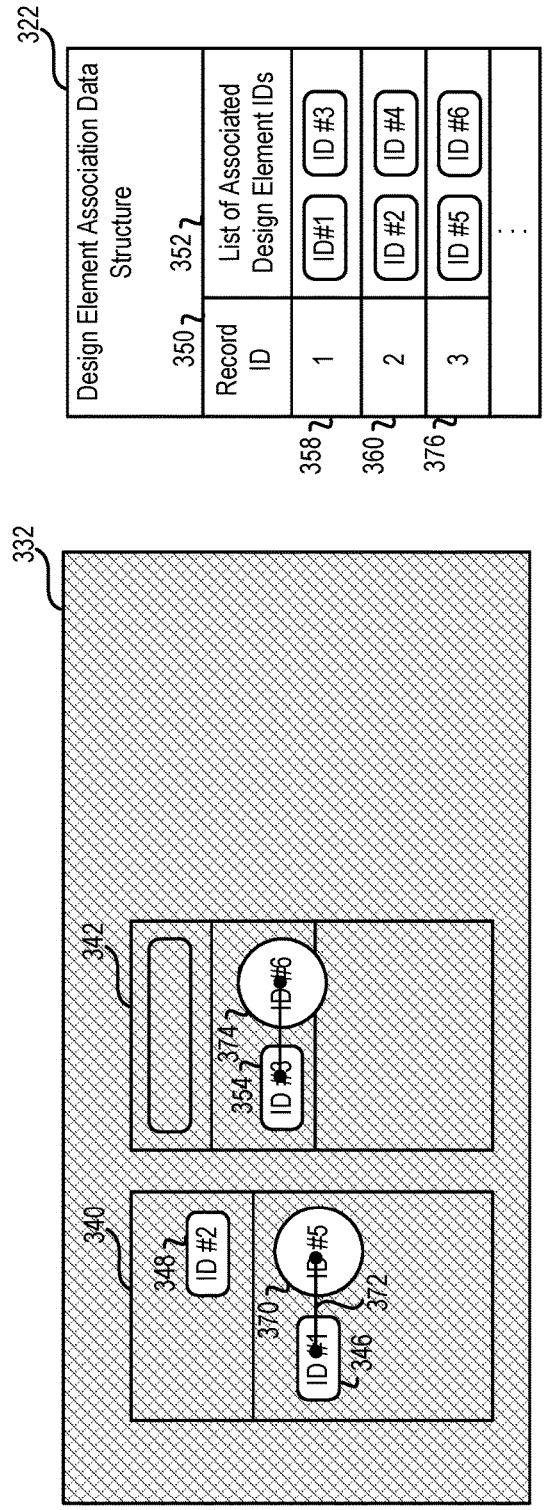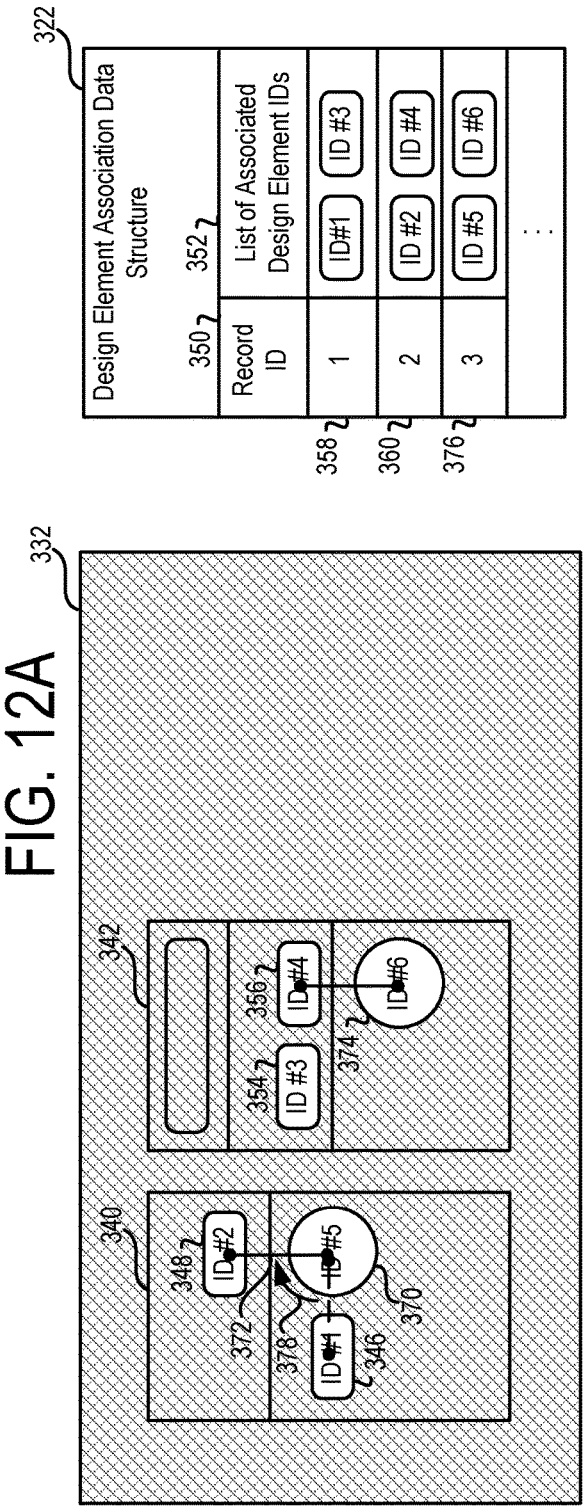
FIG. 12A
FIG. 12B

ELEMENT ASSOCIATION AND MODIFICATION

BACKGROUND

A design project will often include many separate but related panels. The panels may represent user interface screens. For example, a user interface design may include several user interface screens that are designed separately but are similar to each other. The user interface screens may, for example, illustrate a designed user interface flow within an application.

Various design tools are available to help a designer generate a design project. The design tool may include a workspace that shows one or more of the panels. In some instances, the workspace will include one or more artboards that can, for example, define a user interface screen. The artboard may correspond to a defined region of the workspace that sized for specific screen dimensions. The workspace may include several artboards. The workspace may also include regions that are not part of an artboard.

Each of the user interface screens may be designed within an artboard and may include multiple design elements such as shapes, images, text fields, buttons, etc. Often these design elements are repeated on multiple user interface screens. In fact, a designer may copy-and-paste design elements between multiple user interface screens to save design time and so that the user interface screens have a similar look-and-feel.

Design processes are often iterative. For example, a designer may generate an initial design and then may make several modifications (e.g., based on feedback from stakeholders). When design elements are repeated on multiple user interface screens, the designer may need to repeat design changes multiple times (i.e., once for each user interface screen that includes the repeated design elements). Making these updates can be tedious, time-consuming, and error prone.

Some design tools allow a designer to generate reusable design elements. The designer may then be able to modify all instances of the reusable design element in the design project. These types of reusable design elements, however, lack flexibility. For example, a designer may be able to independently modify an instance of a reusable design element without modifying all of the instances. Additionally, the reusable design elements need to be generated before being placed on user interface screens. Accordingly, a designer may be unable to user a reusable design element if it is not initially apparent that a specific element will be used on multiple user interface screens. If a designer has already copy-and-pasted a design element onto multiple panels it may be too late to use a reusable design element.

SUMMARY

A general aspect is a computer-implemented method for editing elements in multiple artboards. The method includes receiving an isolation session-initiation user input that identifies a first design element arrangement on a first artboard in a workspace on a user interface. The method also includes, responsive to receiving the isolation session-initiation user input, identifying a second artboard in the workspace based on the second artboard including a second design element arrangement that is associated with the first design element arrangement, and updating the user interface to display the first artboard and the second artboard within an isolation session.

Another general aspect is a system that includes at least one processor, memory storing a design element association data structure configured to store associations between design elements, and memory storing instructions that, when executed, cause the at least one processor to implement an application. The application includes a design element association data structure configured to store associations between design elements and a design element association engine. The design element association engine is configured to receive a design element association user input that identifies a first design element disposed on a first artboard of a workspace displayed on a user interface of the application and responsive to receiving the design-element association user input, add an association record to the design element association data structure that associates the first design element with a second design element on a second artboard of the workspace.

Another general aspect is a system that includes at least one processor, memory storing a design element association data structure configured to store associations between design elements, and memory storing instructions that, when executed, cause the at least one processor to implement an application. The application includes a design element association data structure configured to store associations between design elements and a user interface. The user interface is configured to receive an isolation session-initiation user input that identifies a first design element arrangement on a first artboard in a workspace on the user interface. The user interface is also configured to responsive to receiving the isolation session-initiation user input: identify a second artboard in the workspace based on the second artboard including a second design element arrangement that is associated with the first design element arrangement, and display the first artboard and the second artboard within an isolation session.

The details of one or more implementations are set forth in the accompanying drawings and the description below. Other features will be apparent from the description and drawings, and from the claims.

BRIEF DESCRIPTION OF THE DRAWINGS

FIGS. 3A and 3B are schematic diagram of an example workspace in which new design elements are added and associated with existing design elements, in accordance with implementations provided herein.

FIGS. 5A and 5B are schematic diagrams of an example workspace in which an isolation session is initiated on selected design elements, in accordance with implementations provided herein.

FIGS. 8A and 8B are schematic diagrams of and example workspace of FIG. 3B in which design elements are disassociated based on a design element modification outside of an isolation session.

FIGS. 10A and 10B are schematic diagrams of an example workspace during an isolation session in which a design element is inserted, in accordance with implementations provided herein.

FIGS. 12A and 12B are schematic diagrams of an example workspace during an isolation session in which a position of a design element associated with a newly added design element is adjusted, in accordance with implementations provided herein.

DETAILED DESCRIPTION

Figure 1:
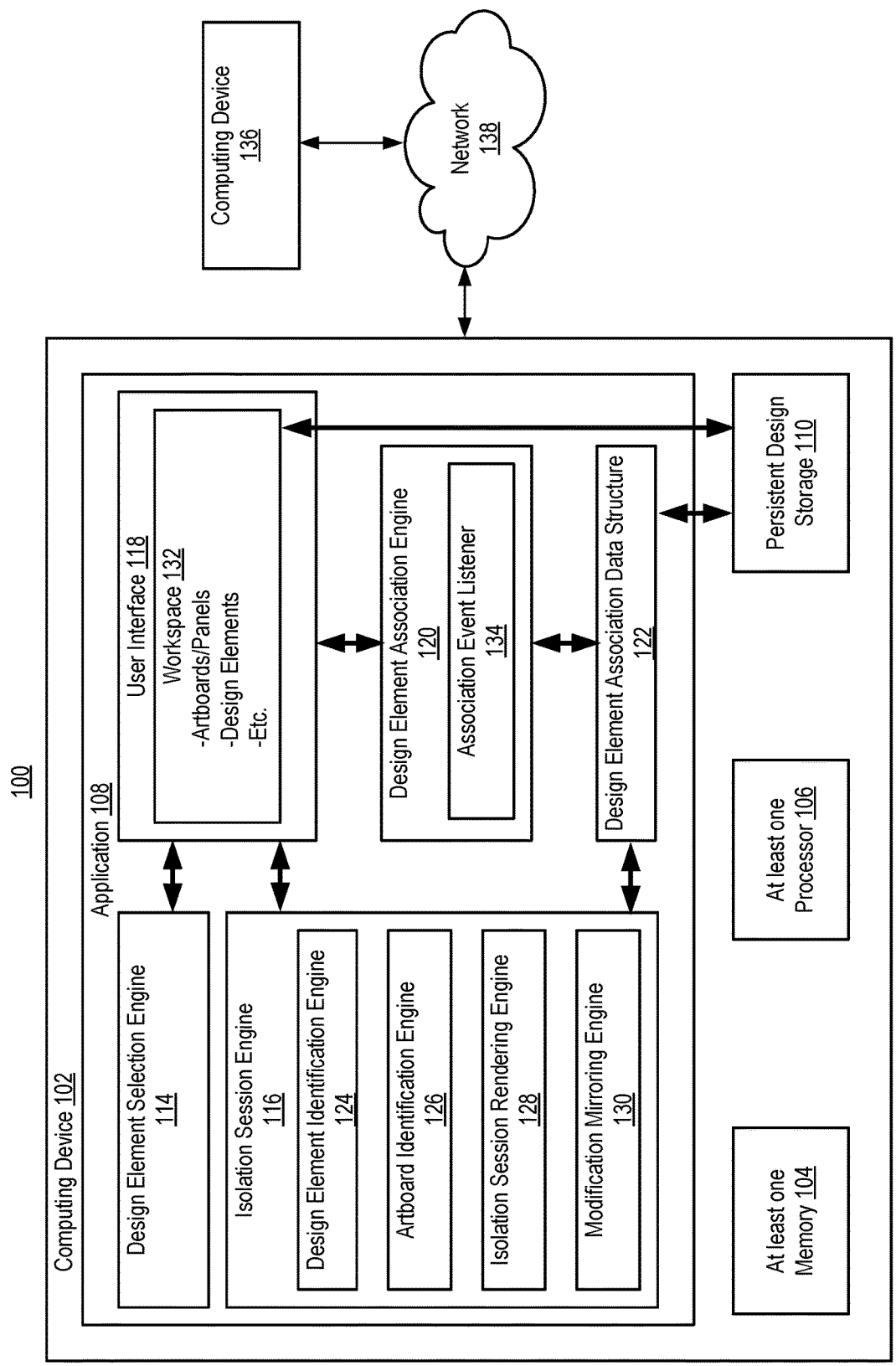
FIG. 1 is a block diagram of a system 100 for design element association and modification.

This description relates to association and modification of multiple design elements within a design project. For example, a graphic design application may include a user interface with a workspace in which a designer (i.e., a user of the graphic design application) can create or modify a design project. The design project may include user interfaces screens for an application, slides for a presentation, or any other type of design. In some implementations, the workspace includes multiple artboards that each correspond to, for example, a slide or user interface screen of the design project.

The designer may add several design elements to each of the artboards. In some instances, at least some of the design elements on one artboard are copied from another artboard. In some implementations, when a designer copy-and-pastes a design element (or multiple design elements) from one artboard to a second artboard, the graphic design application associates the copied design element and the pasted design element are with each other. For example, the graphic design application may generate an association record that identifies both the copied design element and the pasted design element in a design element association data structure. In some implementations, records in the design element association data structure include lists of associated design elements. The lists may include two or more design elements. These associations may persist even if the associated design elements are modified independently. Because the graphic design application allows the designer to independently modify the associated design elements, the designer is able to customize each of the associated design elements to its artboard. This kind of individualized customization of design elements would generally not be available when using reusable design elements in a conventional graphic design application.

A designer may then select one or more of the design elements and provide a user input to the graphic design application to enter an isolation session. The graphic design application may then generate an isolation session that allows the designer to modify the selected design elements and any associated design elements, which may be on different artboards. For example, the isolation session may be a session in which the user interface of the graphic design application limits the designer's interactions to only the selected design elements and the identified associated design elements.

In some implementations, the graphic design application identifies the associated design elements using the design element association data structure. The artboards that include either the selected design elements and/or the identified associated design elements may be included in the isolation session. In some implementations, any artboards that do not include at least one of the selected design elements or at least one of the identified associated design elements are not included in the isolation session. Artboards that are not included in the isolation session may be hidden or otherwise not shown on the user interface for the duration of the isolation session. Similarly, in some implementations, the graphic design application renders the design elements that are included in the isolation session using a different style than design elements that are not included in the isolation session. For example, the graphic design application may display the design elements that are included in the isolation session using an active style and any other design elements (e.g., other design elements on included artboards) are displayed using an inactive style. In this manner, the user interface of the graphic design application allows the designer to easily identify all associated design elements across artboards.

Additionally, while the isolation session is active, the graphic design application may mirror modifications to a design element to the associated design elements. In this manner, the graphic design application allows a designer to efficiently make changes across multiple artboards in a consistent manner. For example, the graphic design application may provide the benefits of universal modification that may be provided by reusable design elements in conventional graphic design applications without requiring a user to expressly create a reusable design element and while providing greater flexibility to modify instances of the associated design elements.

As used herein, a design element is a graphical component of a design. Examples of design elements include shapes, images, text fields, and user interface elements such as buttons, drop-down lists, text entry fields, etc.

As used herein, a design element association user input is a user input that indicates that multiple design elements should be associated with each other. In some implementations, a copy-and-paste user input is recognized as a design element association user input.

As used herein, an artboard is a region of a user interface workspace within a graphic design application. An artboard may be used to define a design, such as a user interface or screen design for an application or website. The artboard may have dimension that correspond to a target screen size. A user interface workspace may include multiple artboards that illustrate multiple related designs for the application or website. In some implementations, design elements may be disposed in the user interface workspace, including within artboards and outside of artboards. The design elements that are disposed within an artboard are included in the associated design, while any design elements that are not within an artboard are not included in a design.

As used herein, an isolation session is a period in which an application enters a mode in which interaction is permitted with an identified set of design elements. These identified design elements are included in the isolation session, while other design elements are excluded from the isolation session. In some implementations, the user interface modifies the display of the design element that are included in the isolation session and/or the display of the design elements that are excluded from the isolation session. For example, the design elements included in the isolation session may be displayed using an active style while the excluded design elements are displayed using an inactive style. As described further below, modifications made to design elements within an isolation session may be mirrored to associated design elements. The isolation session may be generated in response to a user input and may be terminated in response to another user input.

As used herein, an isolation session-initiation user input is a user input that indicates that an isolation session should be initiated. Examples of an isolation session-initiation user input include a specific menu option that is associated with initiating an isolation session being selected, a specific combination of keys on a keyboard being pressed, a touch input, a touch gesture input, a voice input, or any other type of user input. In response to the isolation session-initiation user input, an isolation session may be initiated.

As used herein, a design element alignment user input is a user input that indicates an existing design element that should be used to determine a positional relationship between the existing design element and the recently added design element. Additional new design elements that are associated with the recently added design element may be added to other artboards. This positional relationship can be used to determine where to position the additional new design elements on other artboards. Examples of a design element alignment user input include a specific menu option that is associated with specifying an existing design element, or a specific combination of keys on a keyboard being pressed alone or in combination with a mouse or touch input. Other examples of design element alignment user input include a voice input, a touch input or touch gesture input, or any other type of user input. In response to the design element alignment user input at least some of the new or recently added design elements may be repositioned.

FIG. 1 is a block diagram of a system 100 for design element modification and association. The system 100 includes a computing device 102 having at least one memory 104, at least one processor 106, an application 108, and a persistent design storage 110. The computing device 102 may communicate with one or more other computing devices over a network 138. For instance, the computing device 102 may communicate with a computing device 136 over the network 138. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform its various functions over a network.

The at least one processor 106 may represent two or more processors on the computing device 102 executing in parallel and utilizing corresponding instructions stored using the at least one memory 104. Additionally, the at least one processor may include one or more central processing units (CPUs) and/or one or more graphics processing units (GPUs). In some implementations, the at least one memory 104 includes a non-transitory computer-readable storage medium. Of course, similarly, the at least one memory 104 may represent one or more different types of memory utilized by the computing device 102. In addition to storing instructions, which allow the at least one processor 106 to implement the application 108 and its various components, the at least one memory 104 may be used to store data, such as one or more of the images, design projects, or other types of data generated by the application 108 and components used by the application 108. The persistent design storage 110 may include a non-transitory computer-readable storage medium that is configured to store design projects and/or other types of designs or data used by the application 108. Although in FIG. 1, the persistent design storage 110 is shown as being separate from the at least one memory 104, the persistent design storage 110 may be a portion of the at least one memory 104. In some implementations, the persistent design storage 110 may be located externally from the computing device 102, such as on a network-based or cloud-based storage location. Additionally, the persistent design storage 110 may be synchronized with a network-based or cloud-based storage location.

The application 108 may be accessed directly by a user of the computing device 102. In other implementations, the application 108 may be running on the computing device 102 as a component of a cloud network where a user accesses the application 108 from another computing device, such as the computing device 136, over a network, such as the network 138. In one implementation, the application 108 may be a graphic design application or another type of application that includes graphic design capabilities. The graphic design application may be a standalone application that runs on the computing device 102. Alternatively, the graphic design application may be an application that runs in another application such as a browser application. The graphic design application enables a user to create or modify a graphic design. Non-limiting examples of graphic design applications include user interface design applications, vector graphic design applications, presentation design applications, and image design applications.

The application 108 may include a design element selection engine 114, an isolation session engine 116, a user interface 118, a design element association engine 120, and a design element association data structure 122.

The design element selection engine 114 manages the selection state of design elements on the workspace. In some implementations, the design element selection engine 114 receives user inputs or requests from other components of the application 108 to select or deselect one or more design elements on the workspace. For example, design element selection engine 114 may receive a design element selection user input that identifies one or more design elements. Examples of a design element selection user input include a click or double-click with a mouse, or touch on a touch-screen with a finger, stylus, or other pointing device. Other examples of a design element selection user input include a click-and-drag with a mouse to identify design elements within a region or touch-and-drag on a touchscreen to encircle design elements.

In some implementations, a user may also hold a key on a keyboard while identifying design elements with a design element selection user input to indicate to the design element selection engine 114 to add the identified design elements to a group of already selected design elements. In these implementations, when a design element selection user input is received without a key being held down, any currently selected design elements may be deselected when the identified design elements are selected by the design element selection engine 114. Additionally, some implementations may include a drop-down menu with one or more options to select or deselect all or a subset of the design elements.

In response, to a user input or request the design element selection engine 114 may update the selection status of the one or more design elements as appropriate. In some implementations, the selection status may be stored as binary variable associated with a data structure that represents a design element. As another example, the selection status may be stored as a list of identifiers associated with the design elements that are selected. As design elements are selected (or deselected), the design element selection engine 114 may add (or remove) the associated identifier added to the list.

Among other things, the selection status may alter the way a design element is displayed on the user interface 118. For example, the user interface 118 may display an outline around design elements that are selected. In some implementations, the user interface 118 may display selected design elements with foreground and/or background shading that is different than the foreground and/or background shading used for design elements that are not selected.

In some implementations, the application 108 uses the selection status of design elements to determine which design elements to apply certain operations to. For example, certain user inputs to modify a design element may be applied to each selected design element. Similarly, as described further herein, the isolation session engine 116 may include selected elements in an isolation session.

The isolation session engine 116 initiates, manages, and terminates isolation sessions. Initiation and termination of an isolation session may be triggered by user commands. For example, a user may enter an isolation session-initiation user input to initiate an isolation session and the user may enter an isolation session-termination user input to terminate the isolation session. Examples of the isolation session-initiation user input and the isolation session-termination user input may include simultaneously pressing a combination of keys on a physical or virtual keyboard, selecting a menu option from a dropdown menu, or actuating an actuatable user input element on the user interface 118.

In some implementations, the isolation session engine 116 includes a design element identification engine 124, an artboard identification engine 126, an isolation session rendering engine 128, and a modification mirroring engine 130.

The design element identification engine 124 identifies design elements to include or exclude from an isolation session. In some implementations, the design element identification engine 124 identifies design elements that are selected (e.g., are in a selected state based on user inputs) at the time the isolation session is initiated. Additionally, the design element identification engine 124 may identify other design elements that associated with the selected design elements using, for example, the design element association data structure 122. For example, each of the selected design elements may be associated with one or more design elements via an association record stored in the design element association data structure 122. The design element identification engine 124 may identify design elements in various locations in the workspace 132, such as on multiple different artboards. In some implementations, the design element identification engine 124 may also remove design elements from the isolation session (e.g., based on a de-isolate user input indicating to remove the design element from the isolation session or to remove an artboard containing the design element from the isolation session).

The artboard identification engine 126 identifies artboards to include or exclude from an isolation session. In some implementations, the artboards are identified based on including a design element that has been identified for inclusion in the isolation session by the design element identification engine 124. The artboard identification engine 126 may exclude any artboards that do not include at least one design element that is included in the isolation session. In some implementations, the artboard identification engine 126 may be configured to receive user inputs to remove one or more artboards from the isolation session. Upon receiving the user input, the artboard identification engine 126 may remove the identified artboard from the isolation session and trigger the design element identification engine 124 to remove the design elements on the identified artboard from the isolation session.

The isolation session rendering engine 128 renders or modifies the way the user interface 118 is rendered during an isolation session. In some implementations, during the isolation session, the design elements included in the isolation session are rendered in a different style than design elements that are not included in the isolation session. For example, the design elements that are included in the isolation session are rendered in an active style and the design elements that are not included in the isolation session are rendered in an inactive style. The active style may not alter the rendering of the design elements with respect to the rendering of the design elements outside of the isolation session. The inactive style may render the design elements that are not included (or excluded from) the isolation session are rendered differently with respect to how these design elements are rendered outside of the isolation session. For example, the isolation session rendering engine 128 rendering the design elements with an inactive style may include rendering the design elements with a reduced contrast level or reduced color saturation level with respect to how the design elements are rendered outside of the isolation session. The different rendering styles may, for example, indicate to a user that certain design elements are not available for editing within the isolation session.

In some implementations, the isolation session rendering engine 128 may reposition and/or remove artboards within the workspace during an isolation session. For example, the isolation session rendering engine 128 may remove (or hide) any artboards that are not included in the isolation session. The isolation session rendering engine 128 may reposition the artboards that are included in the isolation session so as to occupy a visible portion of the workspace 132. In this manner, the isolation session rendering engine 128 may modify the rendering of the workspace 132 to draw the user's attention to the artboards that are included in the isolation session.

The modification mirroring engine 130 mirrors modifications to design elements included in an isolation session to other associated design elements that are also included in the isolation session. For example, when a user input is received to resize a design element during an isolation session, the modification mirroring engine 130 may identify any associated design elements using the design element association data structure 122 and resize those elements too. In some implementations, the modification mirroring engine 130 only mirrors specific types of modifications. For example, the modification mirroring engine 130 may mirror modifications to a font style used on a design element, but not modifications to the content of text included on a design element. In some implementations, the modification mirroring engine 130 maintains a list of design element modification types to mirror. When a design element modification user input is received, the modification mirroring engine 130 may compare the type of the design element modification indicated by the user input to the list to determine whether to mirror the modification to the associated design elements.

The user interface 118 may include a workspace 132. The workspace 132 can for example display a design project. The design project may include, for example, design elements arranged on artboards. The user interface 118 may include other elements and components, such as tools used for graphic design, image editing, and image manipulation for use as part of the application 108, which are not described here but which also form a part of the application 108. For instance, the user interface 118 may include tools for adding, manipulating, and removing text, shapes, and images to the workspace.

The design element association engine 120 generates and manages associations between design elements within the workspace. For example, the design element association engine 120 may create design element association records in the design element association data structure 122. In some implementations, the design element association engine 120 may include an association event listener 134 that listens for events that generate or terminate an association between design elements. For example, the association event listener 134 may listen for copy-and-paste events and generates an association between the copied design element and the pasted design element. In some implementations, other user inputs may also trigger the design element association engine 120 to associate design elements, such as a selection of a menu option. The design element association engine 120 may remove associations between design elements based on specific user inputs. For example, the association event listener 134 may listen for modifications to design elements that satisfy a disassociation condition. Responsive to the association event listener 134 determining that a modification satisfies a disassociation condition, the design element association engine 120 may remove the modified design element from any design element association records in the design element association data structure 122. Examples of disassociation conditions may include changes to the shape of a design element, and/or changes to a font size or style of a design element.

In some implementations, the application 108 may cause data representing the contents of the workspace 132 and/or a current design project to the persistent design storage 110. This data may be usable to restore the state of the application 108 so that a user may resume working with workspace and/or design project at a later time. For example, the application 108 may store the data on regular intervals, in response to a user command, when the workspace and/or current design project is closed, and/or when the application 108. Later, the application 108 may be able to read the data stored in the persistent design storage 110 to re-open a stored design project and restore the state of the workspace 132. The data that is stored in the persistent design storage 110 may also include a representation of the design element association data structure 122, such that the associations between design elements are restored.

The network 138 may be implemented as the Internet, but may assume other different configurations. For example, the network 138 may include a wide area network (WAN), a local area network (LAN), a wireless network, an intranet, combinations of these networks, and other networks. Of course, although the network 138 is illustrated as a single network, the network 138 may be implemented as including multiple different networks.

Figure 2:
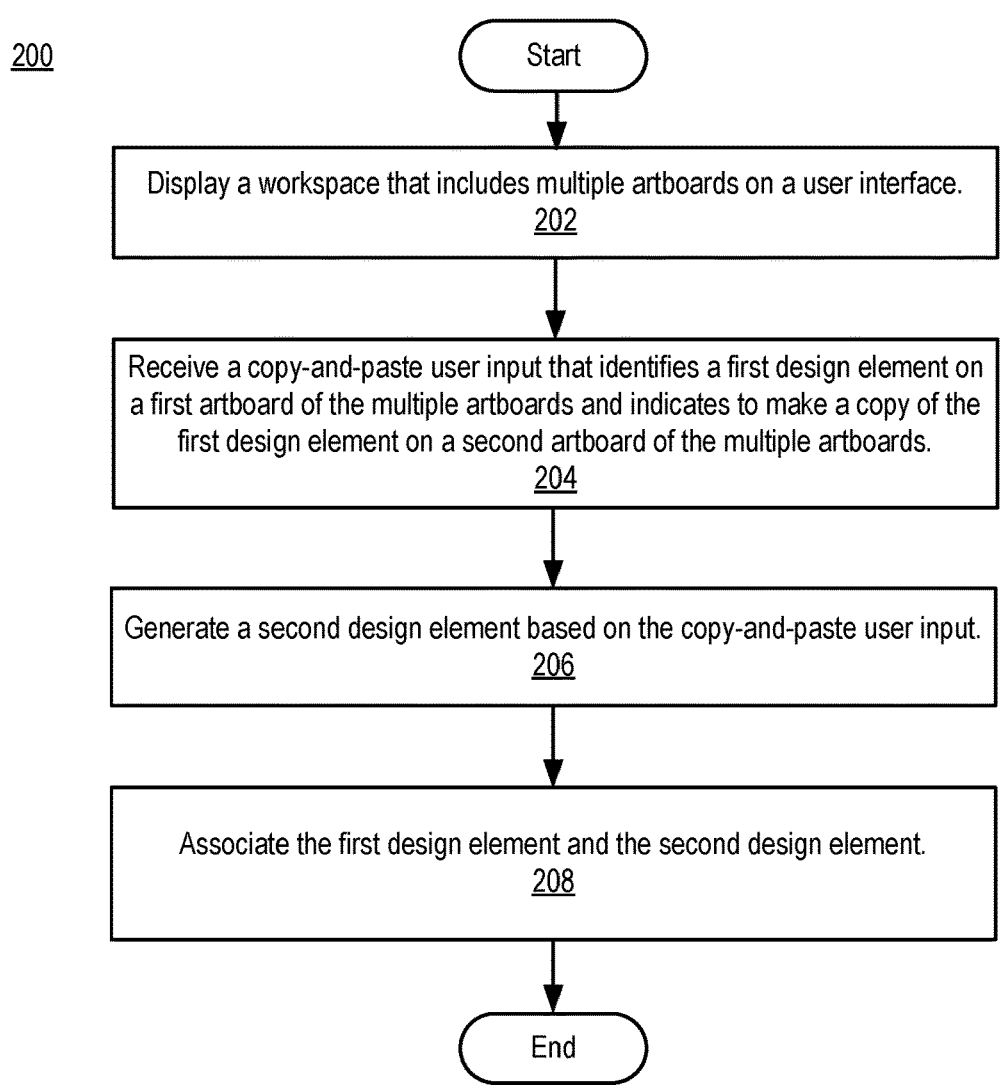
FIG. 2 is an example method to associate design elements in a workspace, in accordance with implementations provided herein.

Referring to FIG. 2, a method 200 illustrates example operations of the system 100 of FIG. 1. The method 200 may be used to associate design elements in a workspace. The method 200 may be performed using, for example, the design element association engine 120.

At operation 202, a workspace that includes multiple artboards is displayed on a user interface. The workspace may, for example, display a design project or a portion of a design project. The design project may be read from the persistent design storage 110.

FIG. 3A shows an example workspace 332 and a design element association data structure 322. The workspace 332 is an example of the workspace 132 and may, for example, be displayed as part of the user interface 118 of the application 108. In this example, the workspace 332 includes a first artboard 340, a second artboard 342, and a third artboard 344. These artboards may, for example, represent designs of user interface screens for a mobile application and include various design elements. For example, the first artboard 340 includes a first design element 346 and a second design element 348. Other design elements are also shown in FIG. 3A, but are not labeled.

The design element association data structure 322 is an example of the design element association data structure 122 and includes a record identifier column 350 and an associated design elements column 352. The design element association data structure 322 may store any number of association records that are usable to identify design elements that are associated with each other. No association records are shown in FIG. 3A. The record identifier column 350 is configured to store an identifier that uniquely identifies an association record. For example, the record identifier column 350 may store a primary key for a relational database table. The design elements column 352 stores information to identify design elements that are associated with each other. For example, the design elements column 352 may store multiple design element identifiers that each uniquely identifies a design element on the workspace 332. In some implementations, the design elements column 352 stores a list of design element identifiers as a string.

Returning now to FIG. 2, at operation 204, a copy-and-paste user input is received that identifies a first design element on a first artboard of the multiple artboards and indicates to make a copy of the first design element on a second artboard of the multiple artboards. For example, a user may select the first design on the first artboard and then may enter a sequence of hotkeys (e.g., ctrl+c, ctrl+v) to copy and paste the selected design element. The user may also select a menu option to copy and paste the selected design element.

At operation 206, a second design element is generated based on the copy-and-paste user input. The second design element may be generated on the first artboard or may be generated on another artboard based on the user input.

At operation 208, the first design element and the second design element are associated with each other. For example, an association record that identifies the first design element and the second design element may be added to a design element association data structure. Thereafter, the association between the first design element and the second design element can be determined by referencing the design element association data structure. In some implementations, the association event listener 134 listens for copy-paste user inputs or other design-element association user inputs.

FIG. 3B shows an example updated workspace 332 in which a third design element 354 and a fourth design element 356 have been generated on the second artboard 342 by copying the first design element 346 and the second design element 348 from the first artboard 340. Additionally, in response to the copy-and-paste user input, a first design element association record 358 is generated in the design element association data structure 322 to associate the first design element 346 and the third design element 354. Similarly, a second design element association record 360 is generated in the design element association data structure 322 to associate the second design element 348 and the fourth design element 356.

Figure 4:
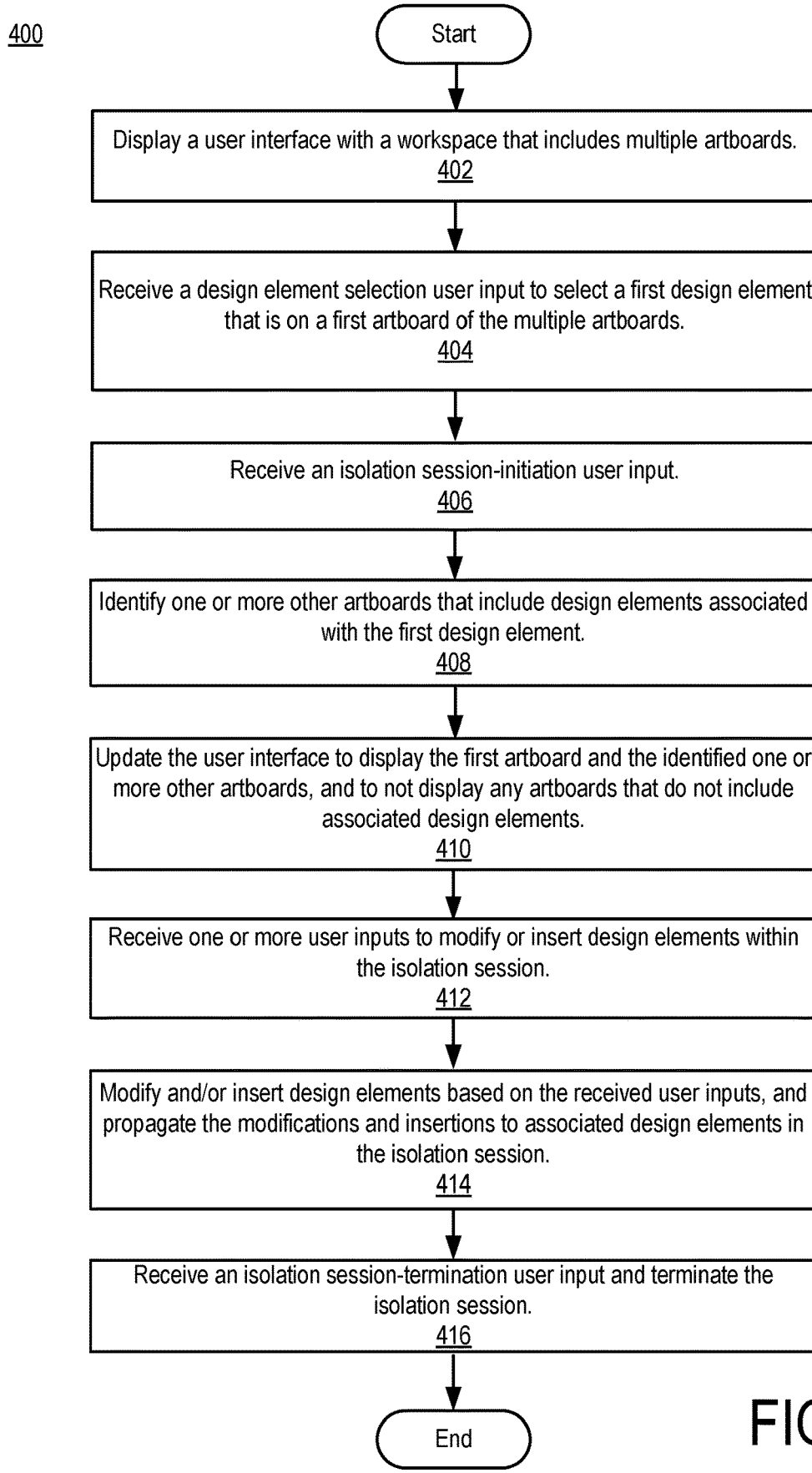
FIG. 4 is an example method to modify multiple design elements in a workspace, in accordance with implementations provided herein.

Referring to FIG. 4, a method 400 illustrates example operations of the system 100 of FIG. 1. The method 400 may be used to modify multiple design elements in a workspace. The method 400 may be performed using, for example, the isolation session engine 116.

At operation 402, a user interface with a workspace that includes multiple artboards is displayed. Operation 402 may similar to operation 202, which has been previously described.

At operation 404, a design element selection user input is received to select a first design element that is on a first artboard of the multiple artboards. For example, a user may use a mouse to click or double-click on the first design element or touch the first design element on a touchscreen. Other examples of a design element selection user input include a click-and-drag with a mouse to identify a region of a workspace that includes a design element and a touch-and-drag on a touchscreen to identify the region.

At operation 406, an isolation session-initiation user input is received. For example, the isolation session-initiation user input may be received based on the user pressing a specific combination of keys on a keyboard.

At operation 408, one or more other artboards that include design elements associated with the first design element are identified. For example, the one or more other artboards may be identified using a design element association data structure based on the other artboards each including at least one design element associated with first design element. These first artboard and the other identified artboards may then be included in the isolation session.

At operation 410, the user interface is updated to display the first artboard and the identified one or more other artboards, and to not display any other artboards that do not include associated design elements. For example, any other artboards that do not include design elements associated with the first design element may be hidden from display. In this manner, the artboards that are included in the isolation session become the primary focus of the workspace. In some implementations, the artboards that are included in the isolation session (or a portion of those artboards) may also be distributed evenly across the workspace.

Additionally, in some implementations, the first design element and design elements associated with the first design element are included in the isolation session, while all other design elements (even those that are on artboards that are included in the isolation session) are excluded from the isolation session. Further, the design elements that are included in the isolation session may be displayed using a first style and all other design elements may be displayed using a second style that is different than the first style. For example, the first style may be an active style that is similar to or the same as the way design elements are displayed when an isolation session is not active. The second style may be an inactive style that is different than the way the design elements are displayed when an isolation session is not active. Displaying design elements using an inactive style may include rendering the design elements with a lower contrast level, with a lower brightness/luminance, or with a lower color saturation. In some implementations, during an isolation session, design elements that are excluded from the isolation session are rendered/displayed differently than those design elements are rendered/displayed when an isolation session is not active.

Some implementations are configured to receive user inputs to remove an artboard from an isolation session so that changes made within the isolation session do not impact the artboard or the design elements thereon. In some elements, the design elements on an artboard that is removed from an isolation session are disassociated from other design elements that are included in the isolation session (e.g., by removing references to these design elements from association records used to identify artboards for the isolation session at operation 408). Similarly, some implementations are configured to receive user inputs to remove a design element from an isolation session.

FIG. 5A shows an example of the workspace 332 in which the first design element 346 and second design element 348 have been selected. FIG. 5B shows an example of the workspace 332 during an isolation session that was initiated based on the selection of the first design element 346 and the second design element 348. As shown in FIG. 5B, the first artboard 340 and second artboard 342 are included in the isolation session. In contrast, the third artboard 344 is not included in the isolation session and is not shown in FIG. 5B.

Additionally, the first design element 346, second design element 348, third design element 354, and fourth design element 356 are also included in the isolation session. In this example, the first design element 346 and second design element 348 are included in the isolation session because they were selected when the isolation session was initiated. The third design element 354 and fourth design element 356 are included in the isolation session based on their being associated with the first design element 346 and second design element 348, respectively. In some implementations, the association between design elements is determined using the design element association data structure 322. For example, the third design element 354 may determined to be associated with the first design element 346 based on the first design element association record 358 in the design element association data structure 322; and the fourth design element 356 may be determined to be associated with the second design element 348 based on the second design element association record 360 in the design element association data structure 322.

In this example, the design elements that are included in the isolation session are shown in a first style that is different from the rest of the workspace 332. As discussed above, the first style may be an active style in which the first design element 346, second design element 348, third design element 354, and fourth design element 356 are displayed in the same manner as they were before the isolation session was initiated (e.g., in the same manner as in FIG. 5A). Design elements that are not included in the isolation sessions, such as fifth design element 362 are shown using a second style that is different than the first style. For example, in FIG. 5B, the fifth design element 362 is shown in an inactive style that is different from the way the fifth design element 362 is shown outside of the isolation session.

At operation 412, one or more user inputs are received to modify and/or insert design elements within the isolation session. Various types of user inputs may be received to modify a design element that is included in the isolation session. These user inputs may identified one more design elements based, for example, on a selection state of the design elements or proximity of the modification input to a design element. For example, a user input to change a color may be received via a right-click with a mouse or a long touch with a touchscreen on a design element. Examples of the user input may indicate to reposition, resize, rotate, or otherwise modify an identified design element. Other examples of user inputs may indicate to modify the color, width, height, or textual content of an identified design element. The user input may also insert a new design element onto an artboard that is included in the isolation session. In some implementations, the user interface prevents modifications to design elements that are excluded from the isolation session.

At operation 414, the design elements are modified or inserted based on the received user inputs, and the modifications and insertions are propagated to associated design elements in the isolation session. For example, the modification may be applied to an identified design element and the design elements associated with the identified design element simultaneously. The associated design elements may be identified using a design element association data structure.

Similarly, if a user input is received that indicates to insert a new design element on a specific artboard, a new design element may be generated and added to the artboard. Additionally, corresponding new design elements may be added to the other artboards that are included in the isolations session. The inserted design elements may then be associated with each other by, for example, adding a design element association record to a design element association data structure.

At operation 416, an isolation session-termination user input is received and the isolation session is terminated. For example, a user input may be received via a selection of a menu option, actuation of a user interface control on toolbar or ribbon of the user interface 118, a specific keypress (or combination of keypresses) on keyboard, or a specific gesture on a touchscreen. In some implementations, when the isolation session terminates, the workspace 132 is returned to its pre-isolation state. For example, the excluded artboards may be shown after an isolation session is terminated. Additionally, excluded design elements may be displayed using an activate style after the isolation session terminates (e.g., design elements may all be displayed using the same style).

Figure 6:
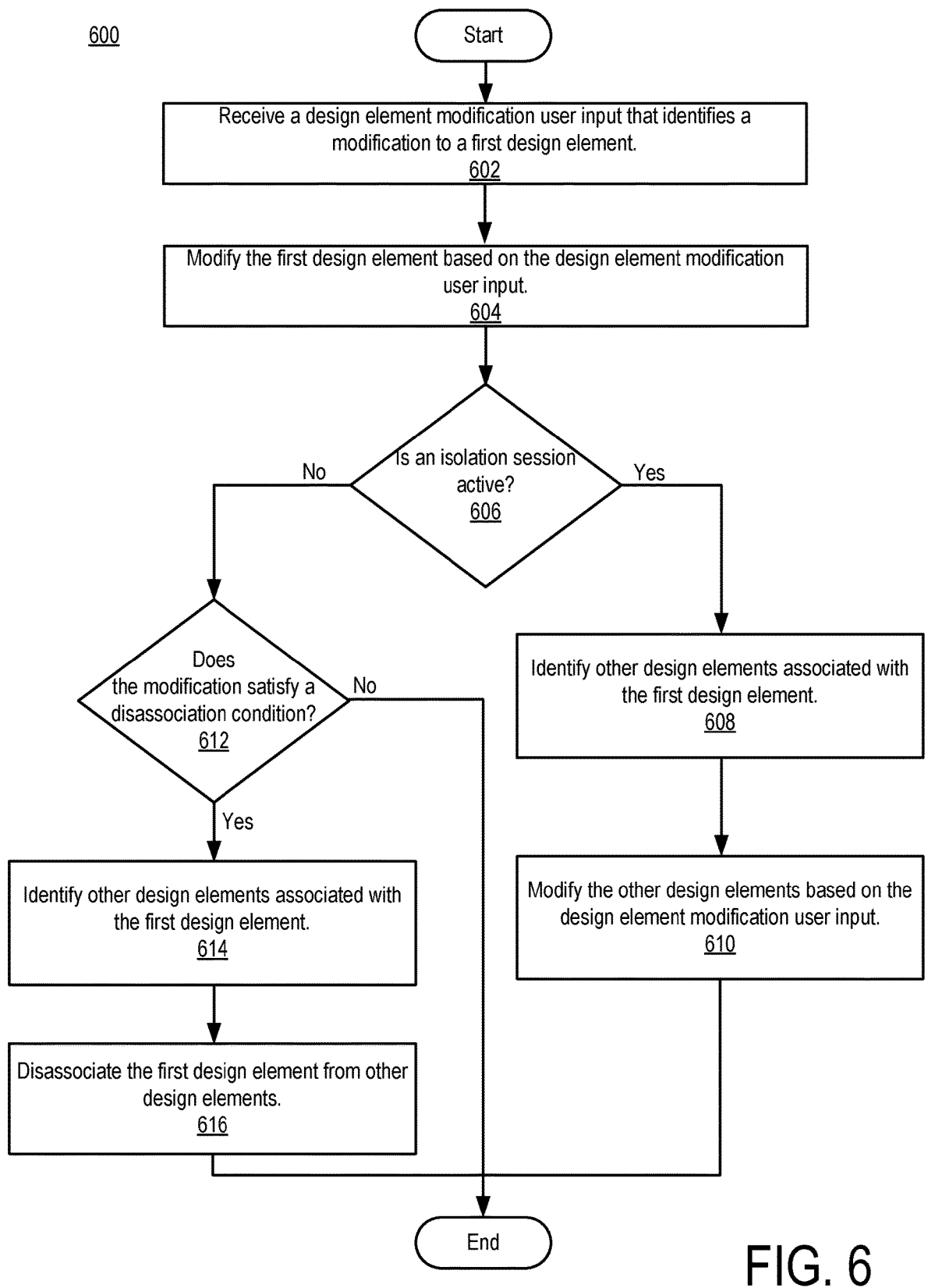
FIG. 6 is an example method to modify a design element in a workspace, in accordance with implementations provided herein.

Referring to FIG. 6, a method 600 illustrates example operations of the system 100 of FIG. 1. The method 600 may be used to modify a design element in a workspace. The method 600 may be performed using, for example, the application 108.

At operation 602, a design element modification user input that identifies a modification to a first design element is received. The design element modification user input may any type of user input that indicates to modify a design element. For example, the design element medication user input may indicate to modify the size, shape, height, width, rotation, skew, position, color, border style, line style, texture, textual content, text size, style, or font, etc. of an identified design element. The design element modification user input may be received via mouse input, keyboard input, touch input, or any other way the design applications receive use input. In some implementations, the application 108 only accepts design element modification user inputs to design elements that are included in an isolation session. Design element modifications user inputs directed to design elements that are excluded from the isolation session may be ignored.

At operation 604, the first design element is modified based on the design element modification user input. In some implementations, the application 108 updates the workspace 132 to show the modified first design element.

At operation 606, is determined whether an isolation session is active. For example, the application 108 may maintain a variable that indicates whether an isolation session is active. To determine whether an isolation session is active, the application 108 may check the value of this variable. When an isolation session is active, the method 600 proceeds to operation 608 to begin the operations to potentially propagate the modifications to other design elements. If an isolation session is inactive, the modifications are not propagated and the method 600 proceeds to operation 608.

At operation 608, other design elements associated with the first design element are identified. For example, the other design elements may be identified using a design element association data structure. The application 108 may query the design element association data structure 122 for association records that include an identifier associated with the first design element. The application 108 may determine that any other identifiers in the association records for the first design element identify other design elements that are associated with the first design element.

At operation 610, the other design elements are modified based on the design element modification user input. After the modifications, the application 108 may update the workspace 132 to show the other design elements as modified. In some implementations, only certain types of modifications to the first design element are propagated to the other design elements. For example, properties of the modification may be compared to a list of modification types that are to be propagated. After applying the modifications to the other design elements, the method 600 may end.

Figure 7A:
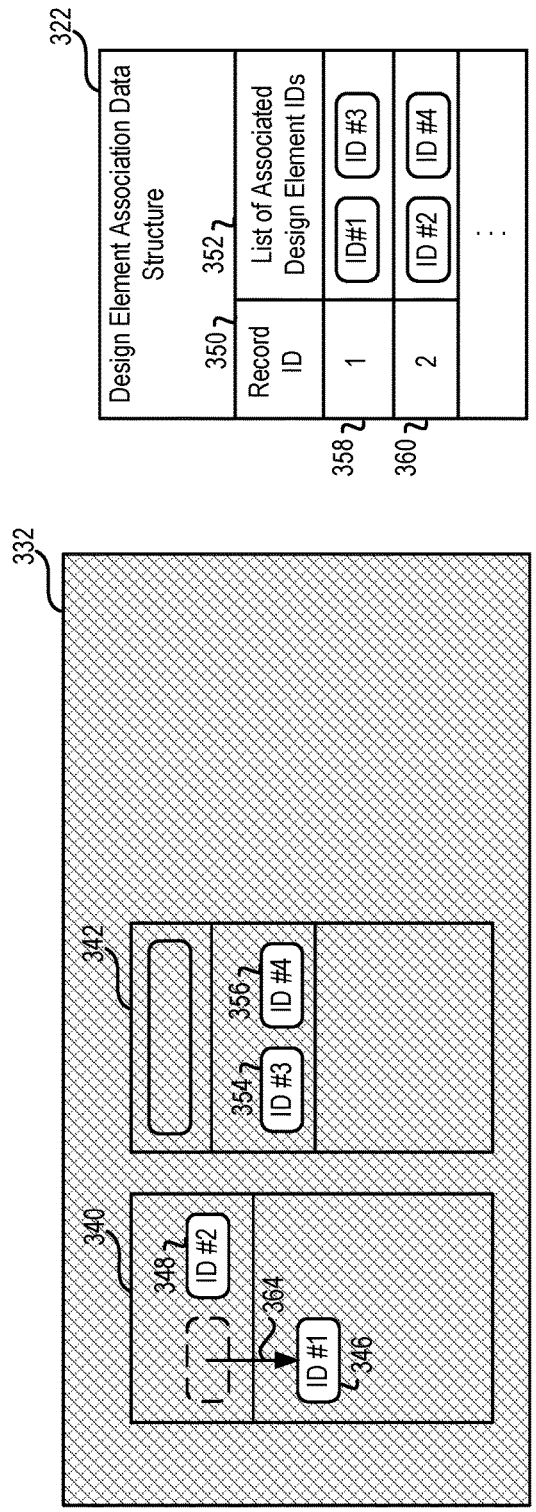
FIGS. 7A and 7B are schematic diagrams of an example workspace in which a design element modification is propagated to associated design elements, in accordance with implementations provided herein.
Figure 7B:
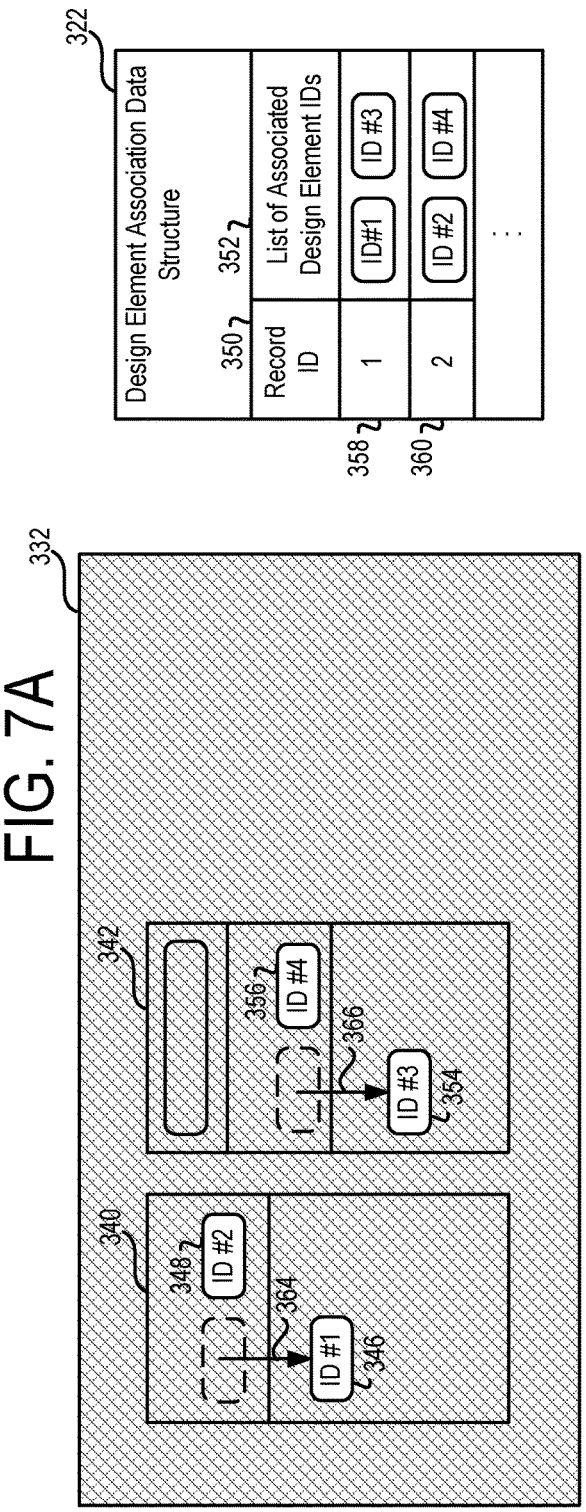

FIGS. 7A and 7B show an example of the workspace 332 during an isolation session in which a design element modification is propagated to an associated design element. Specifically, in FIG. 7A, a design element modification 364 is received to move the first design element 346 to a new lower position on the first artboard 340. In FIG. 7B, a corresponding design element modification 366 is applied to the third design element 354 based on the association between the third design element 354 and the first design element 346 (as indicated by the first design element association record 358 in the design element association data structure 322). In this example, the magnitude and direction of the design element modification 364 and the corresponding design element modification 366 are the same.

Returning now to FIG. 6, at operation 612, it is determined whether the modification satisfies a disassociation condition. If so, the method proceeds to operation 614. If not, the method 600 may end. In some implementations, specific types of modifications to a design element may satisfy a disassociation condition, causing the design element to be disassociated from the other design elements. For example, the types of changes that satisfy a disassociation condition, may change a design element to such a significant degree that it may no longer make sense to synchronize design modifications to other design elements that have not been modified in the same way. As an example, changing the shape of the design element satisfies a disassociation condition in some implementations. Changing a font or text style may also satisfy a disassociation condition in some implementations.

At operation 614, other design elements associated with the first design element are identified. Operation 614 may be performed similarly to operation 608.

At operation 616, the first design element is disassociated from the other design elements. The first design element may be disassociated with other design elements by modifying any association records in the design element association data structure 122 that reference the first design element. For example, association records that reference the first design element may be removed from the design element association data structure 122. As another example, if there are more than two design elements referenced in an association record, the reference to the modified design element may be removed from the association record.

FIGS. 8A and 8B show an example of the workspace 332 in which a design element modification is received outside of an isolation session and causes associated design elements to disassociate. Specifically, in FIG. 8A, a design element modification 368 is received to change the shape of the first design element 346 to a circle. In FIG. 8B, the first design element 346 is shown with a circular shape but the design element modification is not propagated to third design element 354, which is associated with the first design element 346 by the first design element association record 358 in the design element association data structure 322, because there is not an active isolation session. Additionally, in this example, a disassociation condition is satisfied by design element modifications that change the shape of a design element. As shown in FIG. 8B, the first design element association record 358 is removed from the design element association data structure 322.

Figure 9:
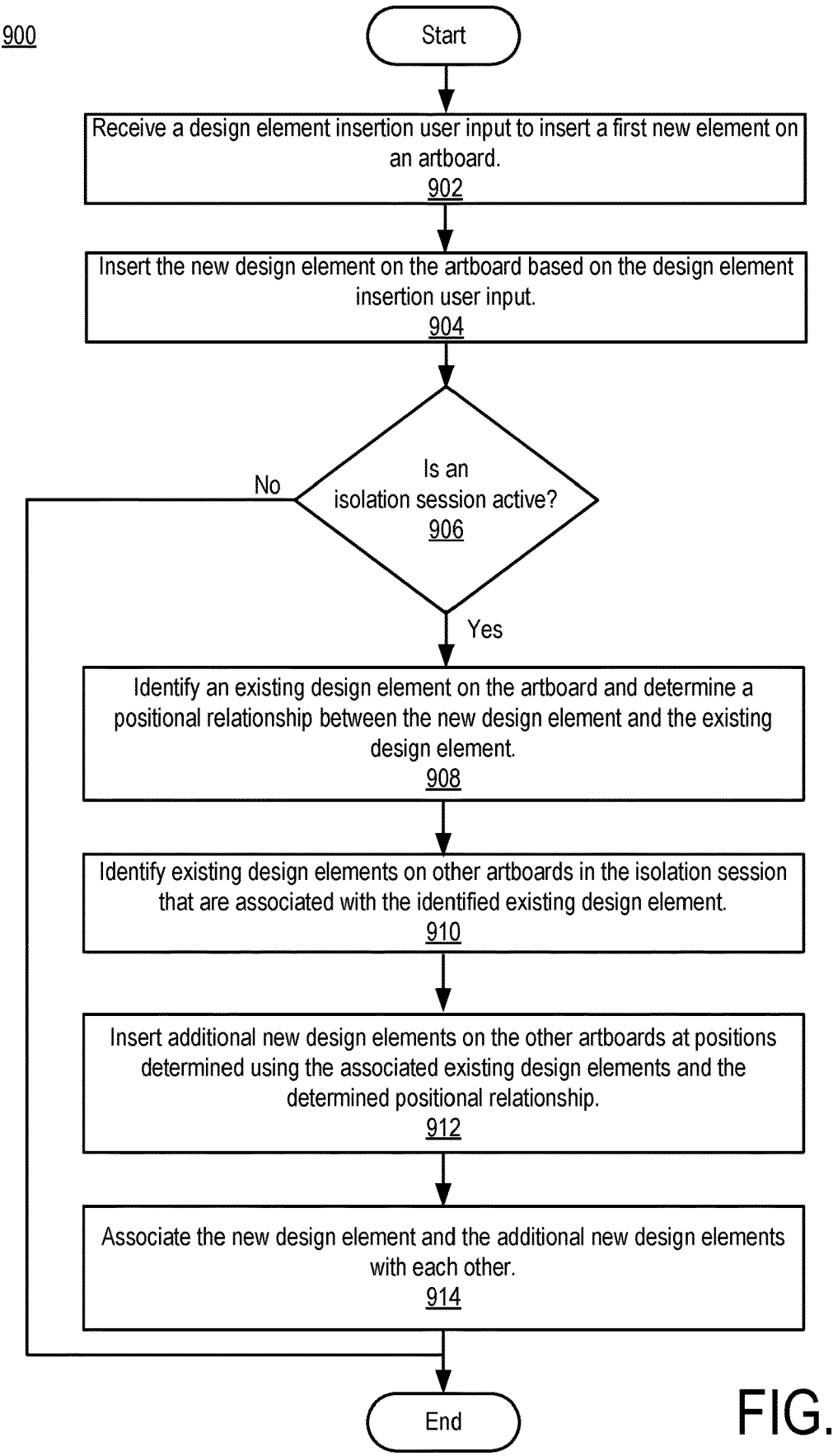
FIG. 9 is an example method to insert a design element in a workspace.

Referring to FIG. 9, a method 900 illustrates example operations of the system 100 of FIG. 1. The method 900 may be used to insert a design element in a workspace. The method 900 may be performed using, for example, the isolation session engine 116 and the design element association engine 120.

At operation 902, receive a design element insertion user input to insert a first new element on an artboard. For example, the design element insertion user input may received based on a menu selection, a keyboard commend, a drag-and-drop action from palette of design elements, etc. The insertion user input may identify an insertion position on the artboard to insert the first new design element.

At operation 904, the new design element is inserted on the artboard based on the design element insertion user input. The workspace 132 may be updated to display the new design element on the artboard.

At operation 906, it is determined whether an isolation session is active. If so, the method 900 proceeds to operation 908. If not, the method 900 ends.

At operation 908, an existing design element on the artboard is identified and a positional relationship is determined between the new design element and the existing design element. In some implementations, the existing design element is identified based on proximity to the position of the inserted design element. For example, the existing design element nearest to the position of the inserted design element may be identified. The positional relationship may be a vector having a magnitude and direction that corresponds to the difference in positions of the existing design element and the new design element. For example, the positional relationship may be determined by comparing the position of a location on the existing design element (e.g., the center, upper-left corner, or any other location) to the position of the corresponding location on the new design element.

At operation 910, existing design elements are identified on other artboards in the isolation session that correspond to the identified existing design element. For example, the existing design elements may be identified using the design element association data structure 122.

At operation 912, additional new design elements are inserted on the other artboards at positions determined using the associated existing design elements and the determined positional relationship. For example, a new design element may be inserted on each of the other artboards at a position that is offset from the associated existing design element on that artboard by the determined positional relationship.

At operation 914, the new design element and the additional new design elements are associated with each other. For example, an association record may be added to the design element association data structure 122 that includes an identifier of the new design elements and identifiers of each of the additional new design elements.

FIGS. 10A and 10B show an example of the workspace 332 during an isolation session in which a design element is inserted. Specifically, in FIG. 10A, a new design element 370 is inserted on the first artboard 340. In FIG. 10B, a positional relationship 372 is determined between the new design element 370 and the first design element 346. In this example, the positional relationship 372 is determined with respect to the first design element 346 based on the proximity of the new design element 370 to the first design element 346. The first design element 346 is associated with the third design element 354 based on the first design element association record 358 in the design element association data structure 322. Based on this association, the third design element 354 is used to determine a position on the second artboard 342 to insert an additional new design element 374. Specifically, the additional new design element 374 is inserted at a position determined by offsetting the position of the third design element 354 based on the positional relationship 372. Also shown in this example, a third design element association record 376 is generated in the design element association data structure 322 to associate the new design element 370 with the additional new design element 374.

Figure 11:
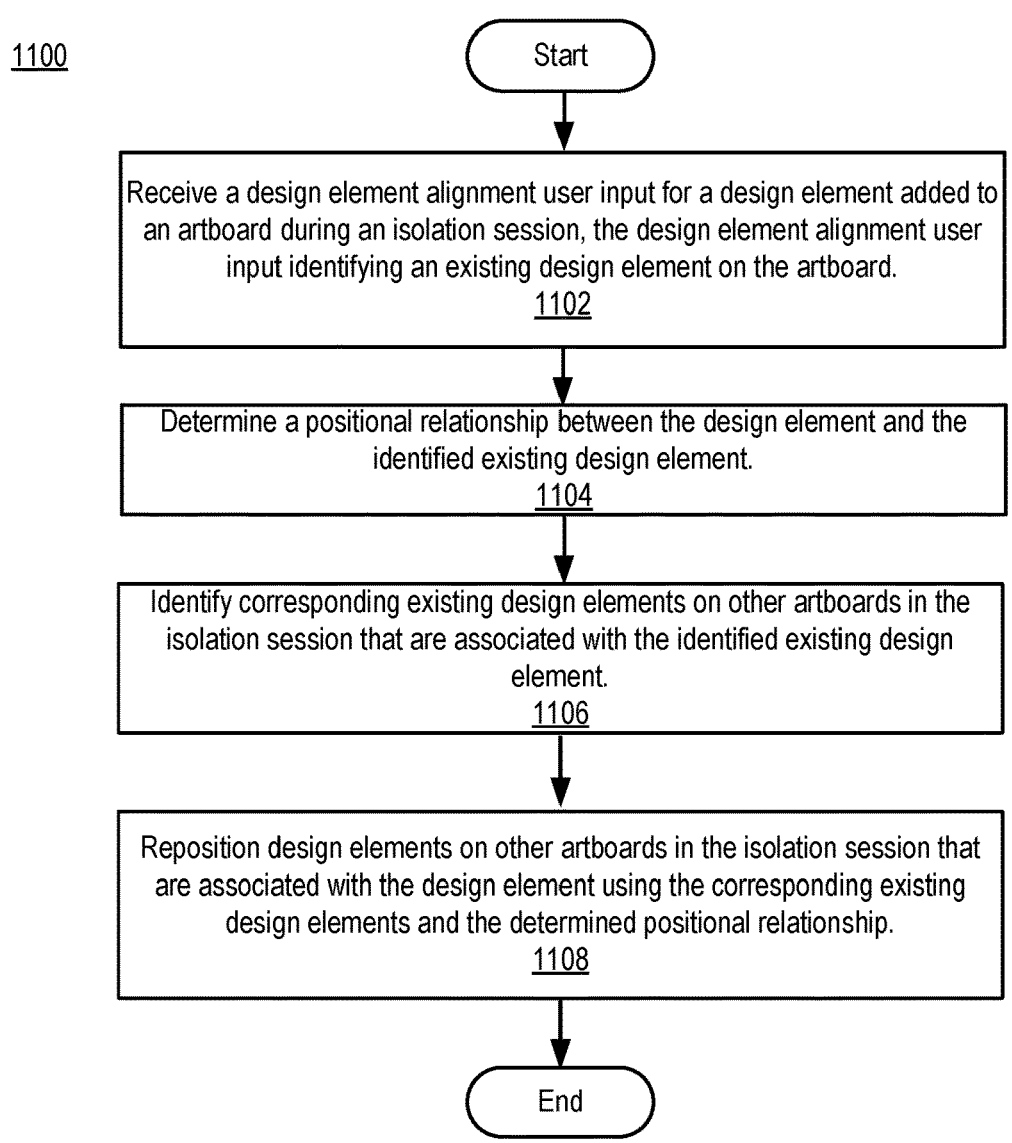
FIG. 11 is an example method to adjust the position of one or more inserted design elements in a workspace.

In this example, the additional new design element 374 overlays the fourth design element 356, which may not be desired. FIGS. 11, 12A, and 12B describe a method of specifying which design element the positional relationship should be determined with respect to.

Referring now to FIG. 11, a method 1100 illustrates example operations of the system 100 of FIG. 1. The method 1100 may be used to adjust the position of one or more inserted design elements in a workspace. For example, the method 1100 may be performed after a new design element is inserted on an artboard and additional new design elements are inserted on other artboards. The method 1100 may allow repositioning one or more of the additional new design elements. The method 1100 may be performed using, for example, the isolation session engine 116.

At operation 1102, a design element alignment user input is received for a design element added to an artboard during an isolation session, the design element alignment user input identifying an existing design element on the artboard. For example, the design element alignment user input may be received after a new design element has been added to an artboard in an isolation session. In response, to the new design element being added, the application 108 may add additional new elements to the other artboards in the isolation session. As an example, the method 1100 may performed after the method 900 ends if a user wishes to change the position of the additional new elements. In some implementations, the workspace 132 may include a visual indicator of which existing design element was used to determine the positional relationship.

In some implementations, the design element alignment user input is a user input that indicates an existing design element that should be used to determine a positional relationship between the existing design element and a recently added design element. Examples of a design element alignment user input include a specific menu option that is associated with specifying an existing design element, or a specific combination of keys on a keyboard being pressed alone or in combination with a mouse or touch input. In response to the design element alignment user input at least some of the new or recently added design elements may be repositioned.

When a new design element is inserted within an isolation session, additional new design elements that are associated with the new design element may be added to other artboards in the isolation session. As described with respect to at least FIGS. 9, 10A, and 10B, the initial positions of these additional new design elements may be determined based on the application 108 selecting an existing design element for which a positional relationship is determined. The additional new design elements may be added to the other artboards at locations determined based on the positional relationship and the locations of other existing design elements that are associated with the selected design element. However, these initial position of the additional new design elements may not be what the user intended. The design element alignment user input can change which existing design element is used to determine the positional relationship and which other existing design elements are used for positioning the additional new design elements on other art boards.

At operation 1104, a positional relationship between the design element and the identified existing design element is determined. The positional relationship may be determined based on the position of the design element added to the artboard and the identified existing design elements in manner similar to that described in operation 908 (e.g., by determining a vector between the centers, the upper-left corner, or another location on the design elements).

At operation 1106, corresponding existing design elements are identified on other artboards in the isolation session that are associated with the identified existing design element. For example, the corresponding existing design elements may be identified using the design element association data structure 122.

At operation 1108, design elements are repositioned on other artboards in the isolation session that are associated with the design element using the corresponding existing design elements and the determined positional relationship. For example, the design elements on the other artboards may be repositioned by offsetting the position of the corresponding existing design element identified at operation 1106 by the positional relationship determined at operation 1104.

FIGS. 12A and 12B show an example of the workspace 332 during an isolation session in which a position of a design element associated with a newly added design element is adjusted. Specifically, in FIG. 12A, the new design element 370 has been added to the first artboard 340 within an isolation session and the positional relationship 372 has been determined with respect to first design element 346. In response to the new design element 370 being added, a additional new design element 374 has been added to the second artboard 342. The additional new design element 374 has been added at a position determined based offsetting from the third design element 354, which is associated with the first design element 346 by the positional relationship 372. In this situation, the additional new design element 374 actually overlays the fourth design element 356, which is unlikely to be what the designer intended.

In FIG. 12B, a design element alignment user input 378 is received to cause the positional relationship 372 to be determined with respect to the second design element 348 rather than the first design element 346. In response, the additional new design element 374 is then positioned with respect to the fourth design element 356 on the second artboard 342. In this example, the position of the additional new design element 374 is determined by offsetting from the fourth design element 356 by the positional relationship 372. Now, the additional new design element 374 no longer overlays the fourth design element 356. Additionally, the positional relationship 372 is maintained across the first artboard 340 and the second artboard 342.

Although the examples herein relate to graphic design applications, other implementations are possible too. For example, implementations may include other types of content generation and/or media development applications, such as word processing applications, spreadsheet applications, and video editing applications. Such applications may, for example, populate an association data structure based on a copy-and-paste of content elements. The applications may then allow a user to select content elements and enter a command to activate an isolation mode to edit only the selected content elements and any associated content elements. For example, with a word processor application, the user interface may display any pages that include the selected and associated content elements (e.g., formatted sections of text).

Implementations of the various techniques described herein may be implemented in digital electronic circuitry, or in computer hardware, firmware, software, or in combinations of them. Implementations may be implemented as an application or computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program or application can be deployed to be executed on one computer or on multiple computers at one site or distributed across multiple sites and interconnected by a communication network. A computer program or application may be configured to perform the operations described herein with instructions stored on a computer-readable memory device.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for editing elements, the method comprising:
   receiving an isolation session-initiation user input that identifies one or more previously selected design elements that include a first design element on a first artboard;
   activating an isolation session that includes the one or more previously selected design elements and a second design element identified by an association data structure, wherein the isolation session limits user interactions to a set of active design elements including the one or more previously selected design elements and an additional set of design elements identified by the association data structure;
   enabling modifications to the first design element to be propagated to the second design element based on the isolation session being active;
   preventing modification of at least one design element that is excluded from the isolation session based on the isolation session being active;
   terminating the isolation session in response to an isolation session termination user input;
   receiving a design element modification user input to the first design element while the isolation session is not active, wherein the design element modification user input includes an instruction to modify a shape, a size, or a font of the first design element;
   modifying the first design element based on the design element modification user input;
   determining that a disassociation condition has been satisfied based on the design element modification user input and the isolation session not being active; and
   automatically updating the design element association data structure to remove an association between the first design element and the second design element.

2. The method of claim 1, wherein receiving the isolation session-initiation user input includes receiving a design element selection user input to select the first design element on the first artboard.

3. The method of claim 1, further comprising:
   displaying the first design element and the second design element using a first style; and
   displaying other portions of the first artboard using a second style.

4. The method of claim 3, wherein the first style is an active style and the second style is an inactive style.

5. The method of claim 4, wherein the inactive style has a lower contrast level than the active style.

6. The method of claim 1, further comprising:
   receiving a second design element modification user input to the first design element; and
   responsive to receiving the second design element modification user input:
      modifying the first design element based on the second design element modification user input; and
      modifying the second design element based on the isolation session being active and the second design element modification user input, the second design element being associated with the first design element.

7. The method of claim 1, further comprising:
   responsive to receiving a design element insertion user input to the first artboard:
      inserting a first new design element on the first artboard at a first insertion position that is determined based on the design element insertion user input; and
      determining a positional relationship between the first new design element and the first design element, the first design element being identified based on the first insertion position.

8. The method of claim 7, further comprising:
   receiving a design element alignment user input for the first new design element, wherein the design element alignment user input identifies the first design element; and
   in response to receiving the design element alignment user input:
      determining an alternative positional relationship based on the first new design element and the first design element; and
      repositioning the first new design element on the first artboard based on the alternative positional relationship.

9. A system comprising:
   at least one processor;
   memory storing a design element association data structure configured to store associations between design elements; and
   memory storing instructions that, when executed, cause the at least one processor to implement an application, the application configured to:
      receive a design element association user input that identifies a first design element disposed on a first artboard of a workspace displayed on a user interface of the application;

add an association record to the design element association data structure that associates the first design element with a second design element on a second art board displayed on the user interface;
receive an isolation session-initiation user input that identifies one or more previously selected design elements that include the first design element on the first artboard;
activate an isolation session that includes the one or more previously selected design elements and the second design element, wherein the isolation session limits user interactions to a set of active design elements including the one or more previously selected design elements and an additional set of design elements identified by the association data structure;
enable modifications to the first design element to be propagated to the second design element based on the isolation session being active;
prevent modification to other portions of the first artboard and the second artboard that are excluded from the isolation session;
terminate the isolation session in response to an isolation session termination user input;
receive a design element modification user input to the first design element while the isolation session is not active, wherein the design element modification user input includes an instruction to modify a shape, a size, or a font of the first design element;
modify the first design element based on the design element modification user input;
determine that a disassociation condition has been satisfied based on the design element modification user input and the isolation session not being active; and
automatically update the design element association data structure to remove an association between the first design element and the second design element.

10. The system of claim 9, wherein the design element association user input is a copy-and-paste user input and the application is configured to generate the second design element in response to the copy-and-paste user input, the second design element being a copy of the first design element.

11. The system of claim 9, wherein the application is further configured to receive a design element insertion user input to the first artboard while the isolation session is active; and
responsive to receiving the design element insertion user input:
insert a first new design element on the first artboard;
insert a second new design element on the second artboard; and
add an association record to the design element association data structure that associates the first new design element with the second new design element.

12. The system of claim 10, wherein the application is further configured to receive a second design element modification user input to the first design element while the isolation session is active; and
responsive to receiving the second design element modification user input:
modify the first design element based on the second design element modification user input;
determine that the second design element is associated with the first design element based on the design element association data structure; and
responsive to determining that the second design element is associated with the first design element, modify the second design element based on the second design element modification user input.

13. A system comprising:
at least one processor;
memory storing a design element association data structure configured to store associations between design elements; and
memory storing instructions that, when executed, cause the at least one processor to implement an application, the application configured to:
receive an isolation session-initiation user input that identifies one or more previously selected design elements that include a first design element on a first artboard displayed on a user interface of the application;
activate an isolation session that includes the one or more previously selected design elements and a second design element identified by an association data structure, wherein the isolation session limits user interactions to a set of active design elements including the one or more previously selected design elements and an additional set of design elements identified by the association data structure;
enable modifications to the first design element to be propagated to the second design element based on the isolation session being active;
prevent modification of at least one design element that is excluded from the isolation session based on the isolation session being active;
terminate the isolation session in response to an isolation session termination user input;
receive a design element modification user input to the first design element while the isolation session is not active, wherein the design element modification user input includes an instruction to modify a shape, a size, or a font of the first design element;
modify the first design element based on the design element modification user input;
determine that a disassociation condition has been satisfied based on the design element modification user input and the isolation session not being active; and
automatically update the design element association data structure to remove an association between the first design element and the second design element.

14. The system of claim 13, wherein the application is further configured to:
display the first design element and the second design element using a first style; and
display other portions of the first artboard using a second style.

15. The system of claim 13, wherein the application is further configured to:
update a value of a variable indicating whether the isolation session is active based on the received isolation session-initiation user input; and
determine whether the isolation session is active based on the value of the variable, wherein enabling modifications to the first design element to be propagated to the second design element is based on the determination.

* * * * *